(12) United States Patent
Benyamin et al.

(10) Patent No.: US 11,371,432 B2
(45) Date of Patent: Jun. 28, 2022

(54) AIRCRAFT ENGINE INTAKE ARRANGEMENT COMPRISING A MECHANICAL DECOUPLER

(71) Applicant: SAFRAN AIRCRAFT ENGINES, Paris (FR)

(72) Inventors: Serge Benyamin, Moissy-Cramayel (FR); Antoine Jean-Philippe Beaujard, Moissy-Cramayel (FR); Tewfik Boudebiza, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 128 days.

(21) Appl. No.: 16/488,858

(22) PCT Filed: Feb. 28, 2018

(86) PCT No.: PCT/FR2018/050466
§ 371 (c)(1),
(2) Date: Aug. 26, 2019

(87) PCT Pub. No.: WO2018/158537
PCT Pub. Date: Sep. 7, 2018

(65) Prior Publication Data
US 2019/0383216 A1 Dec. 19, 2019

(30) Foreign Application Priority Data

Feb. 28, 2017 (FR) ..................... 17 00201

(51) Int. Cl.
*F02C 7/04* (2006.01)
*F01D 21/04* (2006.01)
(Continued)

(52) U.S. Cl.
CPC ............... *F02C 7/04* (2013.01); *F01D 21/04* (2013.01); *F01D 25/16* (2013.01); *F01D 25/28* (2013.01);
(Continued)

(58) Field of Classification Search
CPC ...... F01D 25/16; F01D 25/162; F01D 25/243; F01D 25/265; F01D 25/28; F01D 21/04;
(Continued)

(56) References Cited

U.S. PATENT DOCUMENTS 3,451,215 A * 6/1969 Barr .................... F02C 7/27
60/787
5,839,878 A * 11/1998 Maier ................... F01D 9/042
415/209.2
(Continued)

FOREIGN PATENT DOCUMENTS

FR 2 956 454 A1 8/2011
FR 3006713 B1 * 10/2016 ........... F01D 25/162

OTHER PUBLICATIONS

International Search Report dated May 22, 2018 in PCT/FR2018/050466 filed Feb. 28, 2018.
(Continued)

*Primary Examiner* — Todd E Manahan
*Assistant Examiner* — Kyle Robert Thomas
(74) *Attorney, Agent, or Firm* — Oblon, McClelland, Maier & Neustadt, L.L.P.

(57) ABSTRACT

A mechanical decoupler (15) at the inlet to a turbomachine is positioned on the outside of an intake casing, where radiating arms (27) meet an external casing (13) so as to partially unload a low-pressure shaft when a significant out-of-balance appears. Because it is positioned a long way from the bearing, the decoupler (15) can be designed with a greater degree of freedom at a location where there is more
(Continued)

space available and where layout constraints are less of an issue. More specifically, it is housed in a cavity (30) of the external casing (13) which opens onto the flow path (5).

13 Claims, 2 Drawing Sheets

(51) Int. Cl.
    *F01D 25/16*     (2006.01)
    *F01D 25/28*     (2006.01)
    *F02K 3/06*     (2006.01)
    *F04D 29/56*     (2006.01)
    *F23R 3/04*     (2006.01)
    *F23R 3/00*     (2006.01)

(52) U.S. Cl.
    CPC .............. *F02K 3/06* (2013.01); *F04D 29/563* (2013.01); *F23R 3/007* (2013.01); *F23R 3/04* (2013.01); *F05D 2240/14* (2013.01)

(58) Field of Classification Search
    CPC .. F02C 7/04; F02C 7/20; F04D 29/563; F04D 29/542; F05D 2240/14; F05D 2260/311
    USPC .................................................. 415/9; 416/2
    See application file for complete search history.

(56) References Cited

U.S. PATENT DOCUMENTS

| | | | |
|---|---|---|---|
| 6,409,472 B1* | 6/2002 | McMahon | F01D 25/246 |
| | | | 415/189 |
| 6,561,760 B2* | 5/2003 | Wadia | F04D 29/584 |
| | | | 415/145 |
| 2004/0006967 A1 | 1/2004 | Clark | |
| 2015/0176431 A1* | 6/2015 | Raykowski | F16C 19/52 |
| | | | 415/9 |
| 2015/0226084 A1 | 8/2015 | Beaujard et al. | |
| 2016/0020151 A1 | 7/2016 | Roach et al. | |
| 2016/0201510 A1* | 7/2016 | Roach | F02C 7/20 |
| | | | 60/797 |

OTHER PUBLICATIONS

French Preliminary Search Report dated Jan. 11, 2018 in French Application 17 00201 dated Feb. 28, 2017.

* cited by examiner

AIRCRAFT ENGINE INTAKE ARRANGEMENT COMPRISING A MECHANICAL DECOUPLER

The invention relates to an aircraft engine inlet arrangement comprising a mechanical decoupler.

Figure 1:
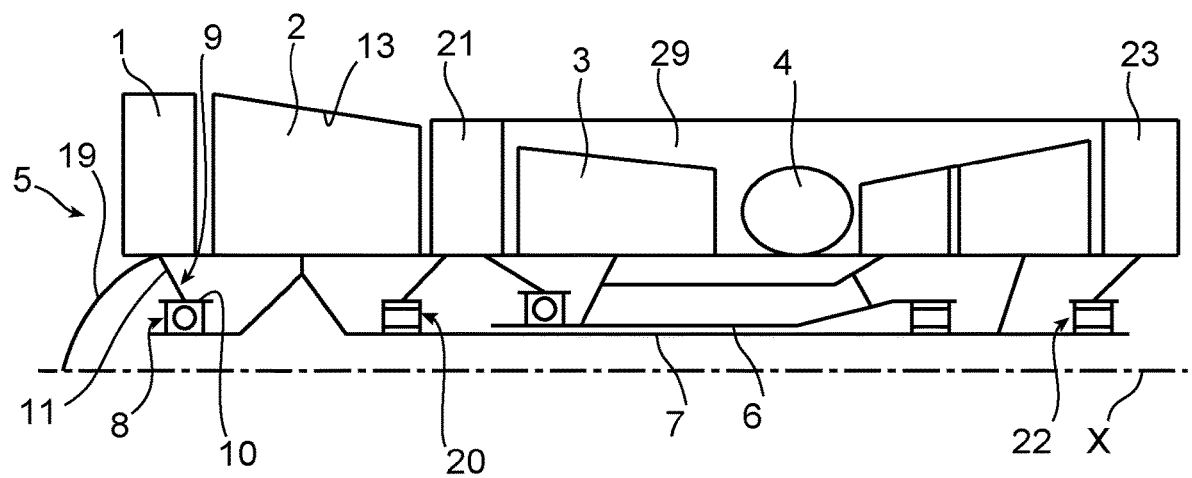

The inlet configuration of a turbomachine to which the invention could be applied is described by means of FIG. 1. It comprises an inlet 1, conventionally followed by low pressure 2 and high pressure 3 compressors, a combustion chamber 4, and then turbines. An annular gas flow stream 5 travels the machine over its entire length and surrounds a high pressure shaft 6 and a low pressure shaft 7 which are concentric with each other and respectively associated with the high pressure compressor 3, and with the low pressure compressor 2. The shafts 6 and 7 are retained by bearings, among which an inlet bearing 8, adjacent to the inlet 1, at the front end of the low pressure shaft 7 will be mentioned. The machine represented is a dual flow machine, the stream 5 being divided at the place of the high pressure compressor 3 to form a secondary flow 29, which is however not essential to adopt the invention.

The bearing 8 is retained (FIG. 2) in a support 9 of the low pressure shaft 7, which comprises a sleeve 10 surrounding the outer ring of the bearing 8 and a frustoconical shell 11 extending forwardly from the machine by flaring from the sleeve 10. The shell 11 is connected to an inlet casing 12, at the inlet of the stream 5 and partly formed by arms 27, which extend radially outwardly through the stream 5, up to an outer casing 13 which circumscribes the stream 5. These arms 27 are usually called rectifiers, because their purpose is to rectify the flow before it arrives on the first stage of movable vanes and accordingly they have an aerodynamic role. They can be radiating or extend tangentially to the hub which delimits the stream 5 to the inner radius, and thus with a slope in the engine angular direction. In general, they consist of an upstream fixed part which can have an angle with respect to the stream and a second downstream variable pitch part, and there are between twelve and twenty arms 27. Since they support the first bearing of the low pressure shaft 7, therefore, they also have a structural role and form the inlet casing 12. The stream 5 is internally delimited, at the inlet 1, by an inlet cone 19 which covers the support 9. The inlet cone 19 is part of the turbomachine stator, the arms 27 connect it to the outer casing 13, and it surrounds the support 9 and the bearing 8. A second and a third bearing 20 and 22, an inter-compressor casing 21, and an exhaust casing 23 are further represented, the behaviour of which will be described later in connection with the invention.

An abnormal machine operation can appear in some failure situations, such as the loss of a low pressure compressor vane 3, most often a vane 18 of the first stage, after a collision with a debris, which introduces a significant unbalance in the shaft concerned, in general the low pressure shaft 7. If a characteristic mode of the rotor concerned (this rotor comprising here the low pressure compressor 2 and the low pressure shaft 7) is close to the rotation speed, the unbalance very strongly amplifies the vibratory response, and dramatic loads are exerted in the engine structure.

A possibility to overcome this situation is to sufficiently reinforce the machine structure in the sensitive places, but at the expense of a dramatic increased weight.

It has also been considered to allow load relief by decouplers which correspond to mechanical fuses, breaking upon occurrence of high loads resulting from this failure situation. When the decoupler is decoupled, the number of bearings supporting the rotor is decreased, for example by leaving only one bearing at the low pressure compressor. The rotor mounting thereby becomes looser, the characteristic modes of the compressor are lowered to pass much below the windmilling rotation speed defined below, and the stresses in the structure do not become excessive.

An example of a mechanical decoupler is described in document FR-A-2 956 454. The support of one of the support bearings of the shaft likely to undergo the failure is mounted on the rest of the machine by an element which is ruptured when a load threshold is reached; this element often consists of a circle with special fixing screws, which comprise a thinned part that the loads can shear. When the rupture threshold is reached, the bearing stops being supported by the rest of the machine and the rotor remains supported only by another bearing, which enables it to be off-centred by a windmilling rotation, but exerting less high loads on the engine structure and with a less strong vibratory response because of the lowered characteristic modes.

Such mechanical decouplers are satisfactory, but it can be however difficult to build the decoupler in the volume of small dimensions which contains the support 9 and which is delimited by the inlet cone 19. Indeed, it is essential that the same remains of a small diameter, to leave, at constant external dimensions of the engine, as large as possible a cross-section at the inlet of the stream 5. But, the addition of a mechanical decoupler to the support 9 will probably force the inlet cone 19 to be widened.

US 2016/0201510 describes an engine in which the inlet cone is rotating, driven by a shaft tip connected to the low pressure shaft by a reducer and carries vanes of an inlet fan which lets the environing air come in a main stream and an external secondary stream beginning at the inlet of the engine. The support bearings of the shaft tip are supported by a structure comprising an inner casing annular part, located in the extension of the inlet cone, an intermediate casing annular portion and arms connecting both annular portions. The assembly is suspended to the stator structure by a spring decoupler. The intermediate casing is tapered forwardly, where it separates the two streams, but it has anyway to house the relatively bulky decoupler. Therefore, there are layout requirements which force either the intermediate casing to be widened, or the arms to be tilted rearwardly to place the decoupler at a wider portion of the intermediate casing, with a more significant overhang.

A first object of the invention is to improve the design and layout possibilities of a mechanical decoupler used for mounting a bearing, by placing the decoupler somewhere else than in the immediate proximity of the bearing, between the same and an element of the inlet casing. Another object of the invention is to maintain a proper mounting rigidity of the engine inlet before a failure and the decoupler rupture, and to maintain proper characteristics of normal operation of the engine, by means of a device which is a light, simple and easy to install, without imposing significant further layout requirements to the neighbouring pieces of equipment. Further objects are not to complicate the engine layout, by placing the decoupler at a place where the layout requirements are low, while removing the decoupler from inside the fixed inlet cone where the available volume is reduced, to maintain this cone at a small diameter; to allow an easy mounting of the decoupler; and further, to maintain a reasonable structure cohesion when a failure occurred, in spite of the decoupler rupture.

To summarise, a general aspect of the invention is an aircraft engine inlet arrangement comprising a rotor with a central rotating shaft, a support of the shaft surrounding the shaft and carrying a bearing in which the shaft is retained, an outer casing surrounding a gas flow stream and an inlet casing joining the outer casing to the support of the shaft, and, at a junction between the outer casing and the inlet casing, a mechanical decoupler designed to break in case of rotor failure, characterised in that the decoupler is positioned at a periphery of the gas flow stream and housed in a cell of the outer casing.

A larger degree of freedom of the layout than in the surroundings of the bearing and its support exists, which enables the decoupler to be built with a larger degree of freedom, without imposing as many requirements to the machine design, in spite of the larger radius at which it is placed. It is indeed easy to shape a cell on the wall of the outer casing, which receives both the arm fixing means and the decoupler. This cell represents a minor modification of the profile of the wall of the outer casing, which reduces the structure irregularities detrimental to the fluidity of the gas flow.

The decoupler can be constructed of a brittle material, which enables it to be readily and immediately ruptured upon occurrence of a load threshold, and to create thus a clearance between the outer casing and the inlet casing, when the threshold is reached.

A suitable material can be a ceramic that can be chosen pre-stressed or porous to adjust the rupture threshold.

Another aspect of the invention is an aircraft engine comprising such an arrangement.

According to some advantageous optional characteristics:
the decoupler connects the outer casing to apices of arms of the inlet casing, which radially extend through the gas flow stream: the direct connection of the decoupler to the radiating arms facilitates miniaturising the connection between the outer casing and the arms of the inlet casing, decouplers with small dimensions can be chosen and housed in small cells;
the arrangement can comprise connecting parts for connecting the outer casing to the decoupler passing through the outer casing and extending in the cell, or connecting parts to the inlet casing passing through the outer casing and extending in the cell: such parts, often screws or bolts, enable the outer casing to directly participate in the connection to the inlet casing, either through the decoupler, or directly if these parts are themselves the decoupler; by extending in the volume internal to the outer casing and in the cell, these parts do not impede the gas flow in the stream and offer a large design simplicity.

Finally, the engine in accordance with the invention—containing the arrangement above—is advantageously a small gas dilution engine in which the inlet casing includes a fixed inlet cone, surrounded by a portion of the outer casing and containing the shaft support and the bearing, the support being connected to the inlet casing; and preferably, the flow stream is single at the inlet of the engine, and the inlet casing comprises arms joining the inlet cone to the outer casing.

Figure 2:
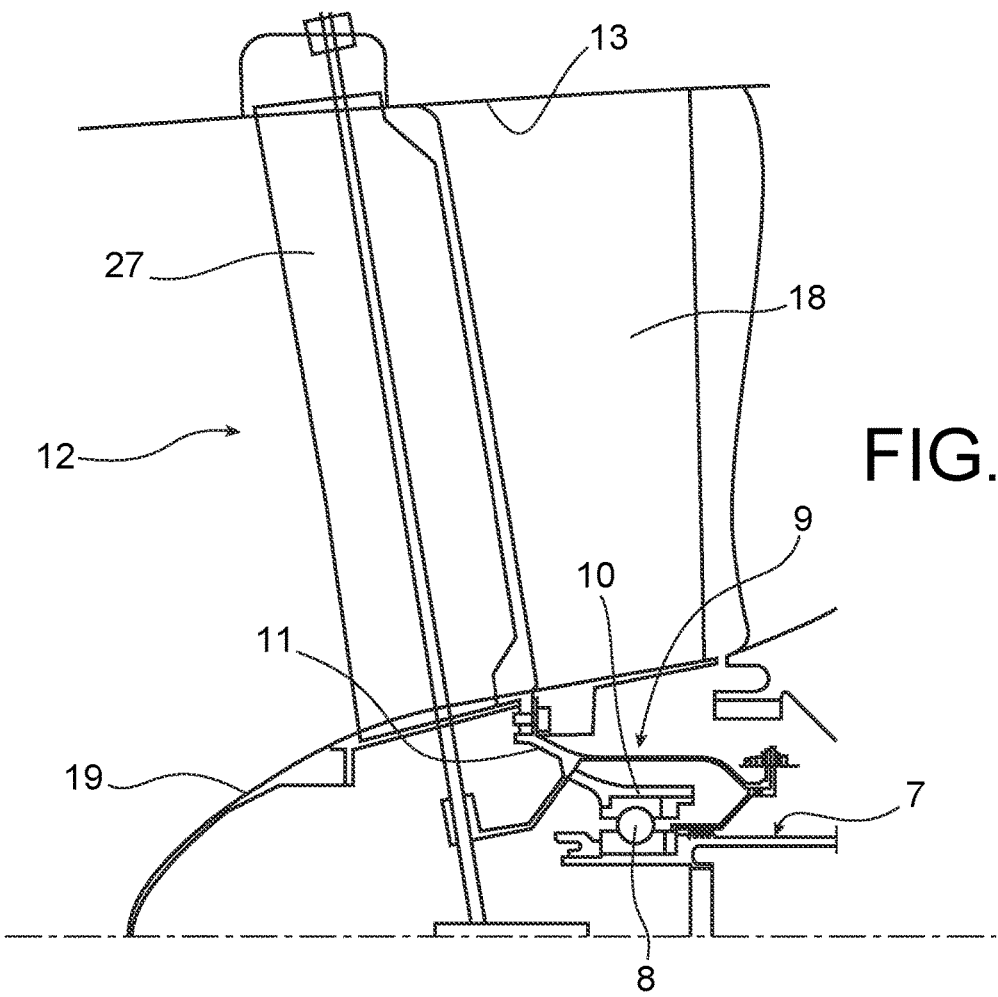
Figure 3:
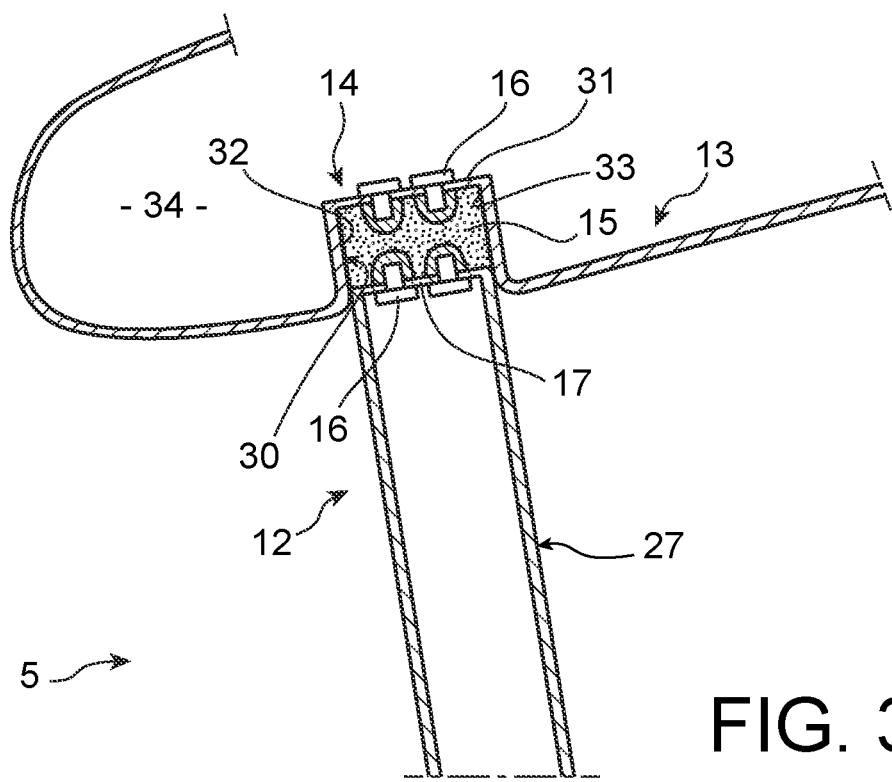
Figure 4:
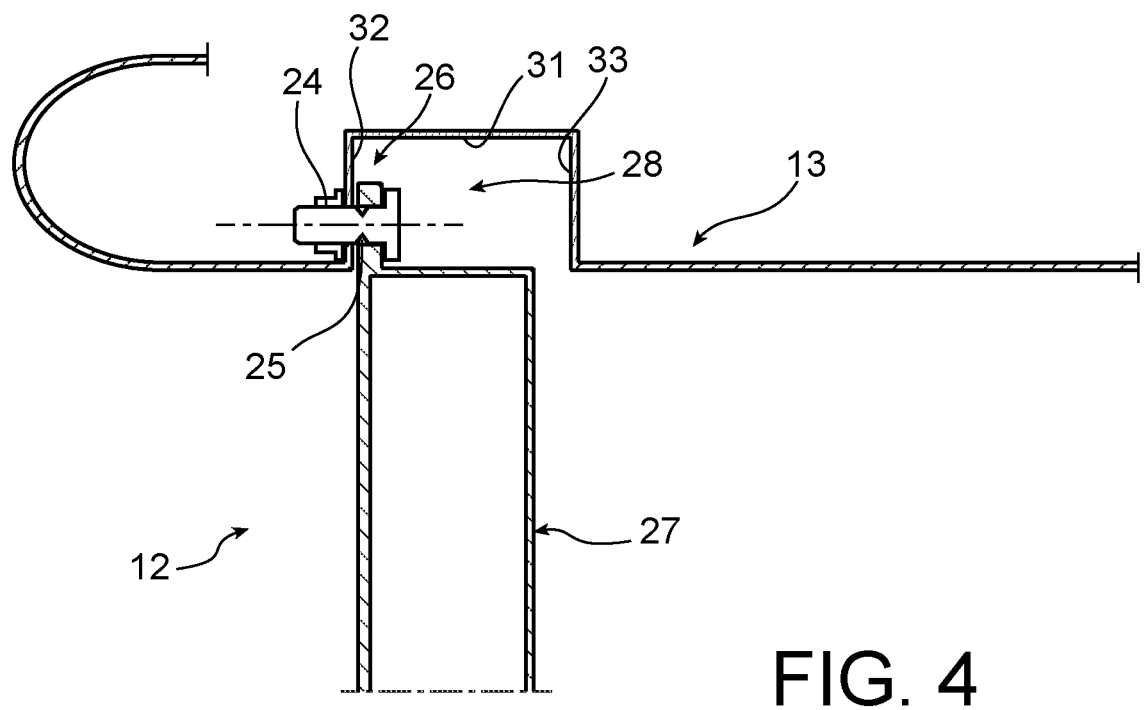

The invention will now be described in detail by means of the figures, which illustrate particular embodiments thereof which do not exclude others:

FIGS. 1 and 2, already described, represent the inlet portion of an aircraft engine and the connection of a first bearing of a low pressure compressor shaft to an inlet casing;

FIG. 3 represents a particular embodiment of the invention;

and FIG. 4, another possible embodiment.

As represented in FIG. 3, the outer edge of the inlet casing 12 now comprises a decoupler 14 sandwiched at the junction with the outer casing 13 at the outer end of the arms 27. It consists of a block 15 of brittle material, abutting through an inner radial face on the inlet casing 12 and through an outer radial face on the outer casing 13, by being fixed thereto by means of screws 16. Since the inlet casing 12 essentially consists of the arms 27, the decoupler 14 can be at the end of each of them or form a continuous or non-continuous annular structure, abutting on a possible outer edge 17, itself continuous, of the inlet casing 12. It can be housed in a cell 30 of the outer casing 13, in order not to disturb the flow regularity. The cell 30 is delimited by a bottom face 31 and two side faces 32 and 33 joining the edges of the bottom face 31 to the outer casing 13. The cell 30 can extend over a full rotation of the outer casing 13 or extend only on angular portions in front of the ends of the arms 27. The cell 30 opens only inwardly radially, that is to the stream 5, and maintains a full insulation between the same and the inner volume 34 delimited by the outer casing 13 about the stream 5. The block 15 is preferentially made of brittle ceramic able to be ruptured above a determined rupture threshold. When a load exceeding a rupture threshold is imposed thereto, it becomes friable and is ruptured, its material is dispersed and the inlet casing 12 can play and oscillate in the radial direction with respect to the outer casing 13. The ceramic can be porous. The block 15 can be pre-stressed between its two fixing faces, to lower if necessary the rupture threshold and modify the deformation at which the rupture occurs. Suitable materials can be technical ceramics, made by sintering which imparts them a high mechanical strength, and which also resist temperatures of several hundred degrees. The rupture threshold of the decoupler can be adjusted with the porosity of the ceramic, its pre-stress, and the thickness of the layer or block it consists of. Examples of such ceramics are alumina and calcium phosphate.

When a vane rupture occurs and that the block 15 is ruptured, the rotor comprising the low pressure shaft 7 is no longer supported by the inlet bearing 8 but by another bearing 20 located a bit downstream, at the place of an inter-compressor casing 21 separating the low pressure compressor 2 from the high pressure compressor 3, as well as by a third bearing 22 located fully downstream, at the place of an exhaust casing 23, but which little intervenes in the dynamic behaviour of the rotor at the place of the low pressure compressor 2. It can be considered that this part of the rotor comprising the low pressure compressor 2 is now supported only by the bearing 20 connected to the inter-compressor casing 21, which makes its support looser and enables it to be centred on its characteristic inertial axis during its windmilling self-rotation and thus to transmit less loads to the turbomachine structure which comprises the inlet casing 12, the outer casing and the inter-compressor casing 21. Thus, it can windmill and dissipate load irregularities produced by the unbalance. Driving the inlet casing 12 (inlet cone 19 and arms 27, the latter having only a small slope in the axial direction of the engine) in radial oscillations, which is an original aspect of the invention, does not essentially modify this state: the ends of the arms 27 radially oscillate in the volumes occupied beforehand by the block 15, and now released by its rupture and the dispersion of its material. The side faces 32 and 33 enable displacements of the ends of the arms 27 to be contained and guided, which extend in the same direction as them, with an insignificant clearance to allow this displacement. The bottom face 31 is at a distance from the end of the arm 27 which can be rather reduced, to possibly limit angular displacements of the inlet casing 12, by letting thereby the arms 27 abut against the bottom faces 31; these displacements are on the other hand often not significant, the low pressure shaft 7 remaining supported by the bearings 20 and 22. The cell 30 does not represent a worsening of the outer casing 13, does not dramatically disturb the flow through the stream 5 and thus does not strongly reduces the inner volume 34, which essentially remains available for other layouts. Finally, it contributes to maintain the engine structure cohesion by keeping retaining the ends of the arms 27 after the block 15 is ruptured.

The block 15 able to be ruptured that has been described up to now could be replaced by an elastic or compressible block, able to undergo elastic or plastic deformations and to break when a load threshold is reached, either because of the material properties of the block itself, or after rupture of complementary fixing means between the inlet casing and the outer casing.

The decoupler of the invention can be constructed in many other different ways, by virtue of the relative degree of freedom of layout in the outer casing 13, which also allows an easier mounting, by virtue of the easy access to the cells 30 opening on the stream 5 and to the larger volume than close to the bearing 8. Mechanical structures with a self-breaking bolt can for example be used instead of the block 15, as illustrated by the arrangement of FIG. 4. Screws 24 oriented in the axial direction X of the machine connect the outer end of the arms 27 to the outer casing 13. The screws 24 are melting screws, provided with a section restriction 25 between its connections to the arm 27 and to the outer casing 13 and making up an incipient break when the loads passing through the arms exert a shearing on the screws 24. A radial clearance 26 is provided between the arms 27 and the outer casing 13, in order to allow a free displacement of the rotor, after rupture; this clearance is also found in embodiments such as that of FIG. 3, when the block 15 has been disintegrated. As in the previous embodiment, the decoupler can be housed at the end of the arms 27, in cells 28 of the outer casing 13 which are analogous to the cells 30 of the embodiment of FIG. 3. However, the use of blocks of brittle material can turn out to be advantageous.

In the case where the arms 27 are not strictly radial, a cutting load is created at the connections between the inlet casing 12 and the outer casing 13, which facilitates the decoupler design. Indeed, since this load is highly prevailing in case of unbalance, it is easier to determine a rupture threshold.

The invention claimed is:

1. An aircraft engine inlet arrangement comprising:
a rotor with a central rotating shaft;
a support of the shaft surrounding the shaft and carrying a bearing in which the shaft is retained;
an outer casing surrounding a gas flow stream and an inlet casing joining the outer casing to the support of the shaft; and
a mechanical decoupler positioned at a junction between the outer casing and the inlet casing, the mechanical decoupler is configured to break in case of rotor failure,
wherein the decoupler is positioned at a periphery of the gas flow stream and housed in a cell of the outer casing, and
wherein the decoupler comprises a block having an inner radial face abutting on the inlet casing and an outer radial face abutting on the outer casing.

2. The aircraft engine inlet arrangement according to claim 1, wherein the decoupler connects the outer casing to apices of arms of the inlet casing, which radially extend through the gas flow stream.

3. The aircraft engine inlet arrangement according to claim 2, wherein the cell is limited by a bottom face, two side faces connecting the bottom face to a main portion, for delimiting the gas flow stream, of the outer casing, the cell opening onto the gas flow stream.

4. The aircraft engine inlet arrangement according to claim 3, wherein the side faces extend in a same direction as the arms with a play to contain and guide displacements of ends of the arms in case of the decoupler rupture.

5. The aircraft engine inlet arrangement according to claim 2, wherein the decoupler comprises connecting parts for connecting the inlet casing to the outer casing comprising an incipient break.

6. The aircraft engine inlet arrangement according to claim 5, wherein the connecting parts pass through the outer casing and extend in the cell.

7. The aircraft engine inlet arrangement according to claim 1, further comprising connecting elements for connecting the outer casing to the decoupler passing through the outer casing and extending in the cell.

8. The aircraft engine inlet arrangement according to claim 1, wherein the decoupler is constructed of a brittle material.

9. The aircraft engine inlet arrangement according to claim 8, wherein the brittle material is a ceramic.

10. The aircraft engine inlet arrangement according to claim 8, wherein the brittle material is pre-stressed.

11. An aircraft engine, comprising an arrangement in accordance with claim 1.

12. The aircraft engine according to claim 11, wherein the inlet casing includes a fixed inlet cone, surrounded by a portion of the outer casing and containing the support of the shaft and the bearing, the support being connected to the inlet casing.

13. The aircraft engine according to claim 12, wherein the gas flow stream is single at the inlet of the engine, and the inlet casing comprises arms joining the inlet cone to the outer casing.

* * * * *